US011140670B2

(12) United States Patent
Takeda et al.

(10) Patent No.: US 11,140,670 B2
(45) Date of Patent: Oct. 5, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 89 days.

(21) Appl. No.: 16/476,150

(22) PCT Filed: Jan. 5, 2018

(86) PCT No.: PCT/JP2018/000054
§ 371 (c)(1),
(2) Date: Jul. 5, 2019

(87) PCT Pub. No.: WO2018/128184
PCT Pub. Date: Jul. 12, 2018

(65) Prior Publication Data
US 2019/0357183 A1 Nov. 21, 2019

(30) Foreign Application Priority Data
Jan. 6, 2017 (JP) ............................ JP2017-001443

(51) Int. Cl.
*H04W 72/04* (2009.01)
*H04L 5/00* (2006.01)
*H04W 72/14* (2009.01)

(52) U.S. Cl.
CPC ......... *H04W 72/042* (2013.01); *H04L 5/0053* (2013.01); *H04W 72/14* (2013.01)

(58) Field of Classification Search
CPC ... H04W 72/04; H04W 72/042; H04W 72/14; H04L 5/0053; H04L 5/0007; H04L 5/0005; H04L 27/26
See application file for complete search history.

(56) References Cited

U.S. PATENT DOCUMENTS

2007/0206559 A1* 9/2007 Cho ...................... H04L 5/0037 370/344
2011/0269475 A1* 11/2011 Berggren ............. H04L 5/0053 455/450

(Continued)

OTHER PUBLICATIONS

Office Action issued in the counterpart European Application No. 18736655.4, dated Jul. 16, 2020 (8 pages).
Written Opinion of the International Search Authority issued in PCT/JP2018/000054 dated Feb. 27, 2018 (4 Pages).
International Search Report issued in PCT/JP2018/000054 dated Feb. 27, 2018 (5 Pages).

(Continued)

*Primary Examiner* — Chi H Pham
*Assistant Examiner* — Vladislav Y Agureyev
(74) *Attorney, Agent, or Firm* — Osha Bergman Watanabe & Burton LLP

(57) ABSTRACT

The present invention is designed so that communication is performed appropriately in radio communication systems that support different numerologies than existing LTE systems. A receiving section that receives a downlink control channel, and a control section that controls detection of candidates for allocating the downlink control channel are provided, where, when the downlink control channel is configured in a plurality of symbols, the control section controls the detection of downlink control channel allocation candidates that are arranged in one-symbol units and downlink control channel allocation candidates that are arranged over multiple symbols.

6 Claims, 22 Drawing Sheets

| CANDIDATE | 1st | 2nd | 3rd |
| --- | --- | --- | --- |
| #1 | ○ | | |
| #2 | | ○ | |
| #3 | | | ○ |
| #4 | ○ | | |
| #5 | | ○ | |
| #6 | ○ | | |

(56) References Cited

U.S. PATENT DOCUMENTS

| | | | | |
|---|---|---|---|---|
| 2015/0296533 | A1 | 10/2015 | Park | |
| 2015/0304992 | A1* | 10/2015 | Nagata | H04B 7/024 370/329 |
| 2015/0373668 | A1 | 12/2015 | Lee et al. | |
| 2016/0226650 | A1* | 8/2016 | Chen | H04L 5/001 |
| 2017/0055249 | A1* | 2/2017 | Yasukawa | H04L 5/0055 |
| 2017/0289966 | A1* | 10/2017 | Islam | H04W 72/042 |
| 2017/0366377 | A1* | 12/2017 | Papasakellariou | H04L 27/261 |
| 2017/0367046 | A1* | 12/2017 | Papasakellariou | H04L 5/0048 |
| 2018/0007673 | A1* | 1/2018 | Fwu | H04L 5/0037 |
| 2018/0049190 | A1* | 2/2018 | Abedini | H04W 76/12 |
| 2018/0109353 | A1* | 4/2018 | Kwak | H04W 72/1273 |
| 2018/0270814 | A1* | 9/2018 | John Wilson | H04W 72/06 |
| 2018/0279270 | A1* | 9/2018 | Sano | H04B 7/04 |
| 2018/0279358 | A1* | 9/2018 | Babaei | H04W 72/0453 |
| 2018/0310283 | A1* | 10/2018 | Deenoo | H04L 5/0048 |
| 2018/0359068 | A1* | 12/2018 | Kim | H04W 72/14 |
| 2018/0376500 | A1* | 12/2018 | Yang | H04L 5/0055 |
| 2019/0037540 | A1* | 1/2019 | Seo | H04W 72/042 |
| 2019/0297601 | A1* | 9/2019 | You | H04L 27/2605 |
| 2020/0351638 | A1* | 11/2020 | Kim | H04L 5/0035 |

OTHER PUBLICATIONS

ZTE, ZTE Microelectronics; "NR DL Control Channel Structure"; 3GPP TSG RAN WG1 Meeting #87, R1-1611292; Reno, USA, Nov. 14-18, 2016 (8 Pages).

Intel Corporation; "NR downlink control channel and DMRS design"; 3GPP TSG-RAN WG1 #87, R1-1611991; Reno, USA Nov. 14-18, 2016 (4 Pages).

InterDigital et. al.; "WF on NR-PDCCH design for URLLC"; 3GPP TSG RAN WG1 Meeting #87, R1-1613639; Reno, Nevada, Nov. 14-18, 2016 (4 Pages).

3GPP TS 36.300 V8.12.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Mar. 2010 (149 Pages).

Office Action issued in European Application No. 18736655.4; dated Mar. 11, 2021 (7 pages).

Office Action issued in Russian Application No. 2019122275/07; dated Mar. 17, 2021 (10 pages).

* cited by examiner

SEARCH SPACE-RELATED PARAMETERS IN LTE

| AGGREGATION LEVEL | NUMBER OF BD CANDIDATES | CRC/C-RNTI LENGTH |
| --- | --- | --- |
| 1 CCE | 6 | 16 bits |
| 2 CCEs | 6 | |
| 4 CCEs | 2 | |
| 8 CCEs | 2 | |

FIG. 1

CANDIDATE
1
2
3
4
5
6
1st
DCI CANDIDATE

FIG. 4A

CANDIDATE
1
2
3
4
5
6
1st
2nd
DCI CANDIDATE

FIG. 4B

CANDIDATE
1
2
3
4
5
6
1st
2nd
3rd
DCI CANDIDATE

FIG. 4C

| CANDIDATE | #1 | #2 | #3 | #4 | #5 | #6 |
| --- | --- | --- | --- | --- | --- | --- |
| 1st | | | | | | |
| 2nd | | | | | | |
| 3rd | | | | | | |

DCI CANDIDATE

FIG. 5C

| CANDIDATE | #1 | #2 | #3 | #4 | #5 | #6 |
| --- | --- | --- | --- | --- | --- | --- |
| 1st | | | | | | |
| 2nd | | | | | | |

DCI CANDIDATE

FIG. 5B

| CANDIDATE | #1 | #2 | #3 | #4 | #5 | #6 |
| --- | --- | --- | --- | --- | --- | --- |
| 1st | | | | | | |

DCI CANDIDATE

FIG. 5A

CANDIDATE
1st
1
2
3
4
5
6
DCI CANDIDATE

FIG. 6A

CANDIDATE
1st
2nd
1
2
3
4
5
6
DCI CANDIDATE

FIG. 6B

CANDIDATE
1st
2nd
3rd
1
2
3
4
5
6
DCI CANDIDATE

FIG. 6C

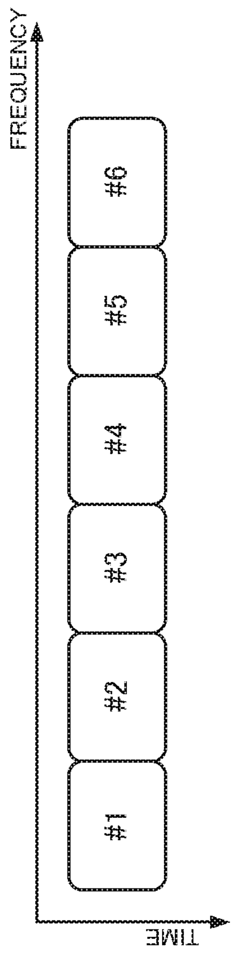
FIG. 8B
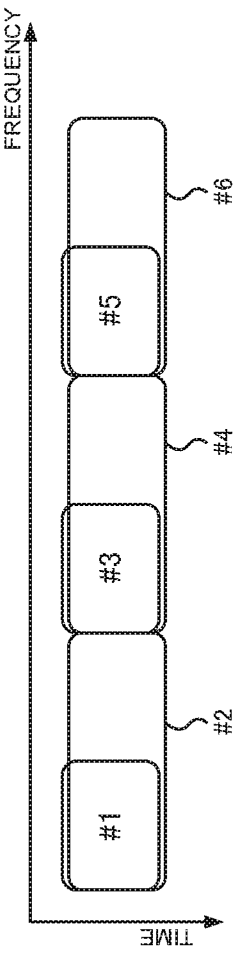
FIG. 8C
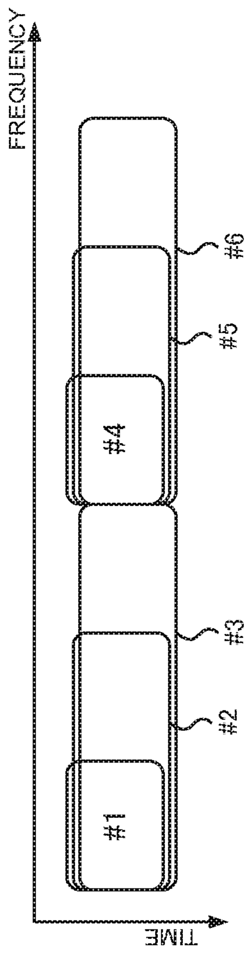
FIG. 8D
| CANDIDATE | 1st |
|---|---|
| #1 | |
| #2 | |
| #3 | |
| #4 | |
| #5 | |
| #6 | |
DCI CANDIDATE
FIG. 8A FIG. 9B
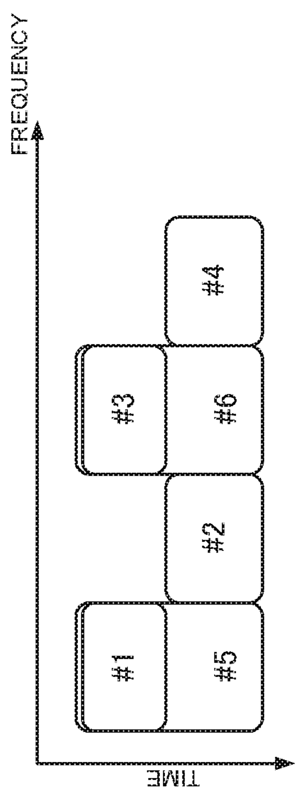
FIG. 9C
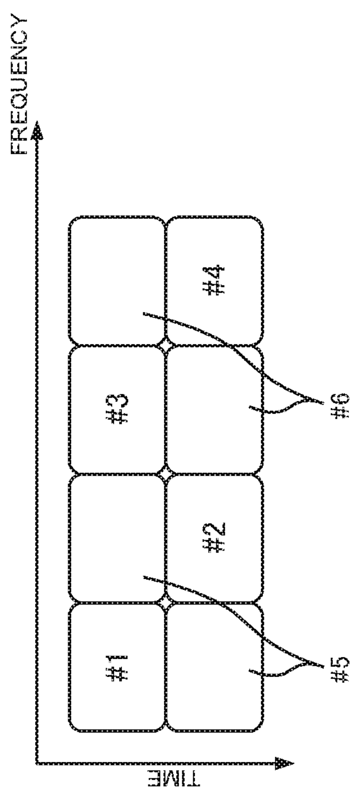
FIG. 9A
| CANDIDATE | 1st | 2nd |
|---|---|---|
| #1 | DCI CANDIDATE | |
| #2 | | DCI CANDIDATE |
| #3 | DCI CANDIDATE | |
| #4 | | DCI CANDIDATE |
| #5 | DCI CANDIDATE | DCI CANDIDATE |
| #6 | DCI CANDIDATE | DCI CANDIDATE |
DCI CANDIDATE

FIG. 11A
| CANDIDATE | 1st |
| --- | --- |
| #1 | ○ |
| #2 | ○ |
| #3 | ○ |
| #4 | ○ |
| #5 | ○ |
| #6 | ○ |
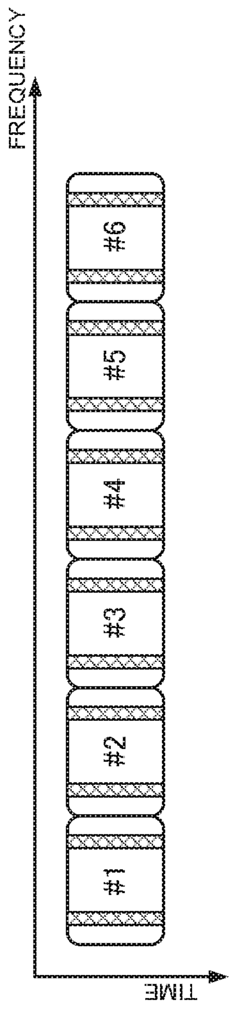
FIG. 11B
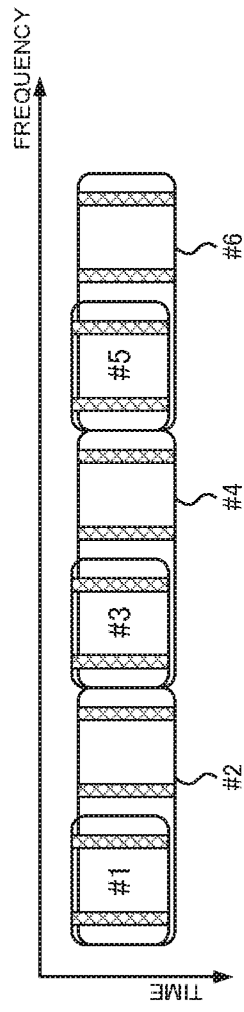
FIG. 11C
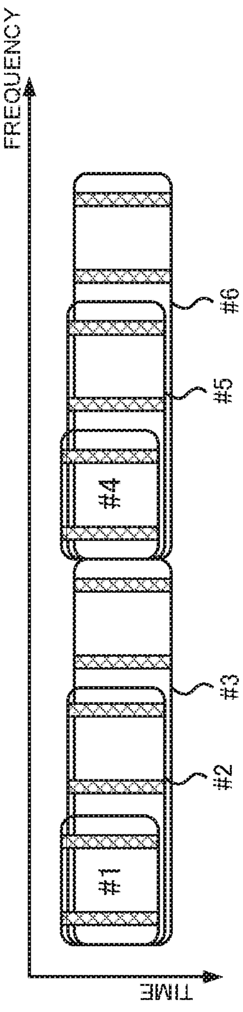
FIG. 11D

| CANDIDATE | 1st | 2nd |
|---|---|---|
| #1 | O | |
| #2 | | O |
| #3 | O | |
| #4 | | O |
| #5 | O | |
| #6 | O | |

| CANDIDATE | 1st |
| --- | --- |
| #1 | ○ |
| #2 | ○ |
| #3 | ○ |
| #4 | ○ |
| #5 | ○ |
| #6 | ○ |

FIG. 13A

| CANDIDATE | 1st | 2nd |
| --- | --- | --- |
| #1 | ○ | |
| #2 | ○ | |
| #3 | ○ | |
| #4 | ○ | |
| #5 | ○ | |
| #6 | ○ | |

FIG. 13B

| CANDIDATE | 1st | 2nd | 3rd |
| --- | --- | --- | --- |
| #1 | ○ | | |
| #2 | ○ | | |
| #3 | ○ | | |
| #4 | ○ | | |
| #5 | ○ | | |
| #6 | ○ | | |

FIG. 13C

| CANDIDATE | 1st | 2nd |
|---|---|---|
| #1 | O | |
| #2 | O | |
| #3 | O | |
| #4 | O | |
| #5 | O | |
| #6 | O | |

| CANDIDATE | 1st |
| --- | --- |
| #1 | ○ |
| #2 | ○ |
| #3 | ○ |
| #4 | ○ |
| #5 | ○ |
| #6 | ○ |

FIG. 15A

| CANDIDATE | 1st | 2nd |
| --- | --- | --- |
| #1 | ○ | |
| #2 | | ○ |
| #3 | ○ | |
| #4 | | ○ |
| #5 | ○ | |
| #6 | ○ | |

FIG. 15B

| CANDIDATE | 1st | 2nd | 3rd |
| --- | --- | --- | --- |
| #1 | ○ | | |
| #2 | | ○ | |
| #3 | | | ○ |
| #4 | | ○ | |
| #5 | | ○ | |
| #6 | | ○ | |

FIG. 15C

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "New RAT (Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. Furthermore, in CA, a plurality of CCs of the same radio base station (referred to as an "eNB" (evolved Node B), a "BS" (Base Station) and so on) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in existing LTE systems (LTE Rel. 8 to 12), frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.). For example, regarding 5G/NR, studies are in progress to provide radio communication services, referred to as "eMBB (enhanced Mobile Broad Band)," "IoT (Internet of Things)," "mMTC (massive Machine Type Communication)," "M2M (Machine To Machine)," and "URLLC (Ultra Reliable and Low Latency Communications)."

In addition, 5G/NR is expected to support flexible use of numerologies and frequencies, and realize a dynamic frame formats. A "numerology" refers to, for example, a set of communication parameters (for example, subcarrier spacing, bandwidth, etc.) applied to transmission and receipt of a certain signal.

However, how to control transmission/receipt in communication where different numerologies (subcarrier spacing, bandwidth etc.) from those of existing LTE systems are supported, is not decided yet. There is also a possibility that multiple numerologies will be supported to meet individual radio communication services. In this case, if the control techniques used in existing LTE systems are used on an as-is basis, it might occur that signals cannot be transmitted and/or received properly (for example, transmission and/or receipt of downlink control channels, and so on), and the requirements for various radio communication services cannot be fulfilled.

The present invention has been made in view of the above, and it is therefore an object of the present invention to provide a user terminal and a radio communication method to enable proper communication in a radio communication system that supports different numerologies than existing LTE systems.

Solution to Problem

According to one aspect of the present invention, a user terminal has a receiving section that receives a downlink control channel, and a control section that controls detection of candidates for allocating the downlink control channel are provided, and, in this user terminal, when the downlink control channel is configured in a plurality of symbols, the control section controls the detection of downlink control channel allocation candidates that are arranged in one-symbol units and downlink control channel allocation candidates that are arranged over multiple symbols.

Technical Advantage of Invention

According to the present invention, it is possible to communicate properly in a radio communication system that supports different numerologies than existing LTE systems.

BRIEF DESCRIPTION OF DRAWINGS

FIG. 1 is a diagram to illustrate search space-related parameters that may be assumed in existing LTE;

FIGS. 4A to 4C are diagrams to illustrate examples of mapping of DCI candidates, according to a first aspect of the present invention;

FIGS. 5A to 5C are diagrams to illustrate other examples of mapping of DCI candidates according to the first aspect of the invention;

FIGS. 6A to 6C are diagrams to illustrate other examples of mapping of DCI candidates according to the first aspect;

FIGS. 8A to 8D are diagrams to illustrate other examples of mapping of DCI candidates according to the first aspect;

FIGS. 9A to 9C are diagrams to illustrate other examples of mapping of DCI candidates according to the first aspect;

FIGS. 10A to 10C are diagrams to illustrate examples of mapping of DCI candidates and reference signals according to a second aspect of the present invention;

FIGS. 11A to 11D are diagrams to illustrate other examples of mapping of DCI candidates and reference signals according to the second aspect;

FIGS. 13A to 13C are diagrams to illustrate other examples of mapping of DCI candidates and reference signals according to the second aspect;

FIGS. 15A to 15C are diagrams to illustrate other examples of mapping of DCI candidates and reference signals according to the second aspect;

DESCRIPTION OF EMBODIMENTS

Figure 2:
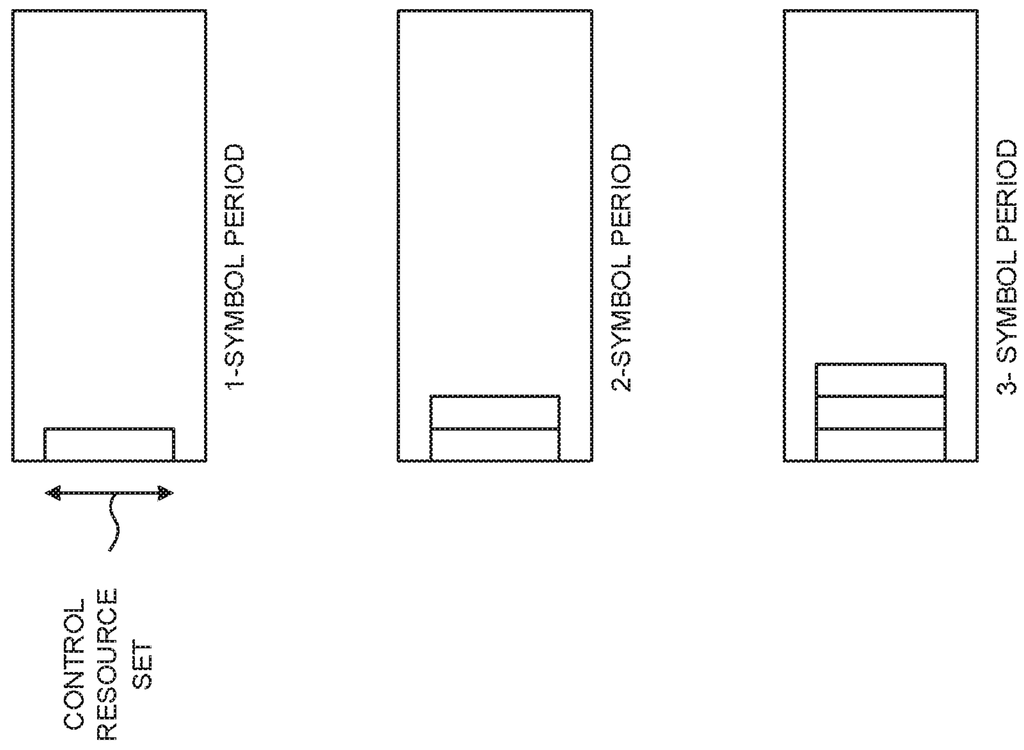
FIG. 2 is a diagram to illustrate an example of the method of configuring control resource sets.

In existing LTE systems, a base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of a downlink control channel.

DCI includes, for example, data-scheduling time/frequency resources, transport block information, data modulation scheme information, HARQ retransmission information, demodulation RS information, and so on. DCI that schedules receipt of DL data and/or measurement of DL reference signals may be referred to as "DL assignment" or "DL grant," or DCI that schedules transmission of UL data and/or transmission of UL sounding (measurement) signals may be referred to as "UL grant." DL assignments and/or UL grants may include information about the resources, sequence, transmission format and/or others of the channel for transmitting UL control signals (UCI: Uplink Control Information), such as HARQ-ACK feedback in response to DL data, channel measurement information (CSI: Channel State Information), and so on. Apart from DL assignments and UL grants, DCI for scheduling UL control signals (UCI: Uplink Control Information) may be set forth.

The UE is configured to monitor a set of a predetermined number of downlink control channel candidates. Monitoring here means, for example, attempting to decode each downlink control channel for the target DCI format in the set. Such decoding is also referred to as "blind decoding (BD)" or "blind detection." Downlink control channel candidates are also referred to as "candidates for allocating downlink control channels," "BD candidates," "(E)PDCCH candidates," "DCI candidates," and so on.

The set of downlink control channel candidates (multiple downlink control channel candidates) to be monitored is also referred to as "search space." The base station places DCI in a predetermined downlink control channel candidates included in the search space. The UE performs blind decoding for one or more candidate resources in the search space, and detects the DCI addressed to the UE. The search space may be configured by high layer signaling that is common between users, or may be configured by user-specific high layer signaling.

In existing LTE (LTE Rel. 8 to 12), a plurality of aggregation levels (ALs) are provided in the search space for the purpose of link adaptation. The ALs correspond to the numbers of control channel elements (CCEs)/enhanced control channel elements (ECCEs: Enhanced CCEs) that constitute DCI. Also, the search space is configured so that there are multiple downlink control channel candidates for a given AL. Each downlink control channel candidate is comprised of one or more resource units (CCEs and/or ECCEs).

Cyclic redundancy check (CRC) bits are attached to the DCI. The CRC is masked (scrambled) using UE-Specific identifiers (for example, cell-radio network temporary identifiers (C-RNTIs)) or a system-common identifier. The UE can detect the DCI where the CRC is scrambled using the C-RNTI for the subject terminal, and the DCI where the CRC is scrambled using the system-common identifier.

Also, as for the search spaces, there are a common search space (C-SS) that is configured for UEs on a shared basis, and a UE-specific search space (UE-SS) that is configured for each UE. In the UE-specific search space for the existing LTE PDCCH, the ALs (=the numbers of CCEs) are 1, 2, 4 and 8. The numbers of BD candidates defined in association with ALs=1, 2, 4 and 8 are 6, 6, 2 and 2, respectively (see FIG. 1).

Now, 5G/NR is required to support flexible use of numerologies and frequencies, and realize dynamic frame formats. Here, a numerology refers to a set of frequency-domain and/or time domain-communication parameters (for example, at least one of the subcarrier spacing (SCS), the bandwidth, the duration of symbols, the duration of cyclic prefixes (CPs), the duration of transmission time intervals (TTIs), the number of symbols per TTI, the format of radio frames, the filtering process, the windowing process and so on).

In 5G/NR, study is in progress to support multiple numerologies and to assign different numerologies to different communication services. For example, it may be possible to reduce latency by applying a high (wide) subcarrier spacing (SCS) for URLLC.

However, in existing LTE systems, in a field where a downlink control channel is allocated (also referred to as a "control resource set"), downlink control channel candidates (blind decoding candidates) are arranged, in a distributed manner, in the frequency domain and the time domain. Therefore, when a control resource set is constituted by a plurality of symbol periods (for example, three symbols), a user terminal has to wait until all three symbols are received and then perform blind decoding for the downlink control channel candidates.

Also in 5G/NR, the control resource set for allocating a downlink control channel may not be limited to being one symbol, and can be configured over multiple symbol periods (see FIG. 2). FIG. 2 illustrates a case where control resource sets are each constituted by one to three symbols. In 5G/NR, if downlink control channel candidates are configured and blind decoding is applied as in existing LTE systems, there is a risk that the delay cannot be sufficiently reduced if the control resource set is configured over multiple symbols.

So, the present inventors have worked on a method for performing receiving processes per predetermined time unit (for example, per symbol) in a predetermined transmission time interval (for example, a TTI), and come up with the idea of using this method for receiving processes for downlink control information. This method for performing receiving processes per predetermined time unit (also referred to as "pipeline processing") will be described with reference to FIG. 3.

Figure 3A:
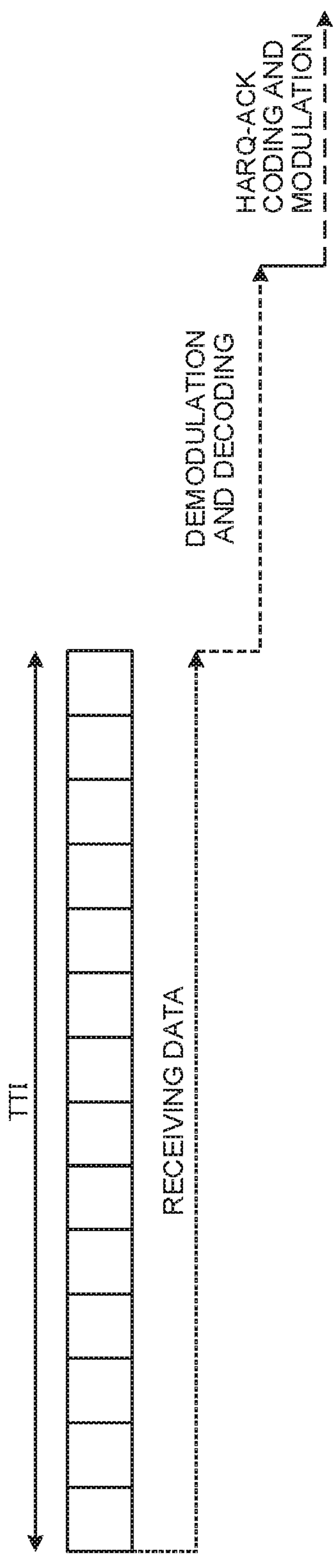
FIG. 3A is a diagram to illustrate non-pipeline processing.

FIG. 3A illustrates a case where, in a transmission time interval, the receiving processes of DL signals (for example, data and/or downlink control information) are performed in this transmission time interval as the unit (referred to as "non-pipeline processing," "non-pipeline processing structure," and so on), The receiving processes performed here include the demodulation process, the decoding process and other processes. In this case, delivery acknowledgment signals in response to DL data (also referred to as "HARQ-ACK," "ACK/NACK," and so on) are also transmitted and received in transmission time interval units.

Figure 3B:
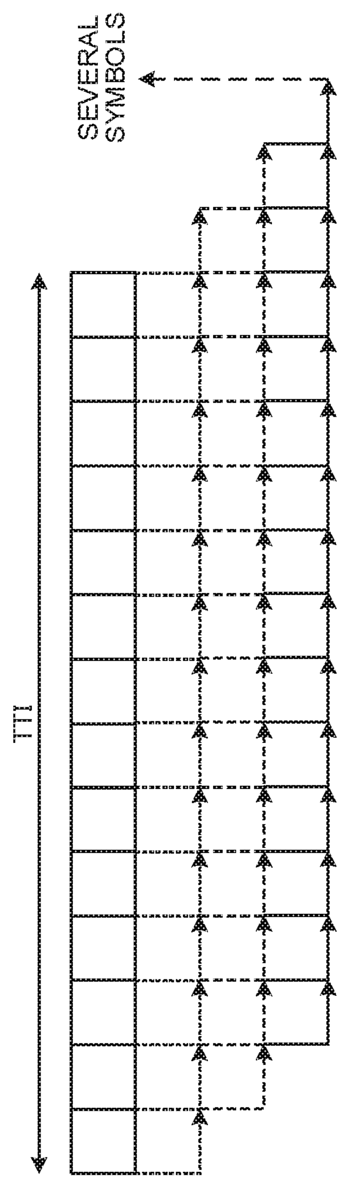
FIG. 3B is a diagram to illustrate an example of pipeline processing.

FIG. 3B illustrates a case where the receiving processes of DL signals are performed in symbol units in a transmission time interval (pipeline processing, pipeline processing structure). In this case, the receiving processes are conducted in symbol units, so that, compared with FIG. 3A, the processing time required for the receiving operation can be shortened (for example, the receiving processes take one or several symbols). Note that pipeline processing may be performed per symbol group (for example, every two symbols), not per symbol.

Thus, the present inventors have come up with the idea of shortening the processing time by applying pipeline processing to the transmission of downlink control information (or downlink control channels). Also, assuming the case where pipeline processing is applied to the transmission of downlink control information, the present inventors have come up with the idea of using a method of arrangement that is different from the method of arranging downlink control channel candidates in existing LTE systems.

According to one aspect of the present embodiment, when a downlink control channel is configured in a plurality of predetermined time units (for example, a plurality of symbols), downlink control channel candidates that are arranged in one-symbol units and/or downlink control channel candidates that are arranged over a plurality of symbols are arranged. In this way, by arranging downlink control channel candidates in predetermined time units (for example, in one-symbol units), a user terminal can detect (receiving process) the downlink control channel candidates in order of symbols that are received.

Now, an embodiment of the present invention will be described in detail below with reference to the accompanying drawings. The search space in the following embodiments may be at least one of a common search space (C-SS), a UE specific search space, a UE group common search space, and/or other search spaces. Furthermore, although a case where the number of blind decoding candidates (also referred to as "downlink control channel-allocation candidates," "DCI candidates," etc.) is six will be described as an example in the following description, the number of candidates that can be applied to the present embodiment is not limited to this. Also, while a case where DCI candidates that are arranged over a plurality of symbols are provided when a control resource set is constituted by a plurality of symbols will be explained in the following description, it is also possible to provide only those DCI candidates that are arranged in one symbol.

(First Aspect)

Figures 4A, 4B, 4C:
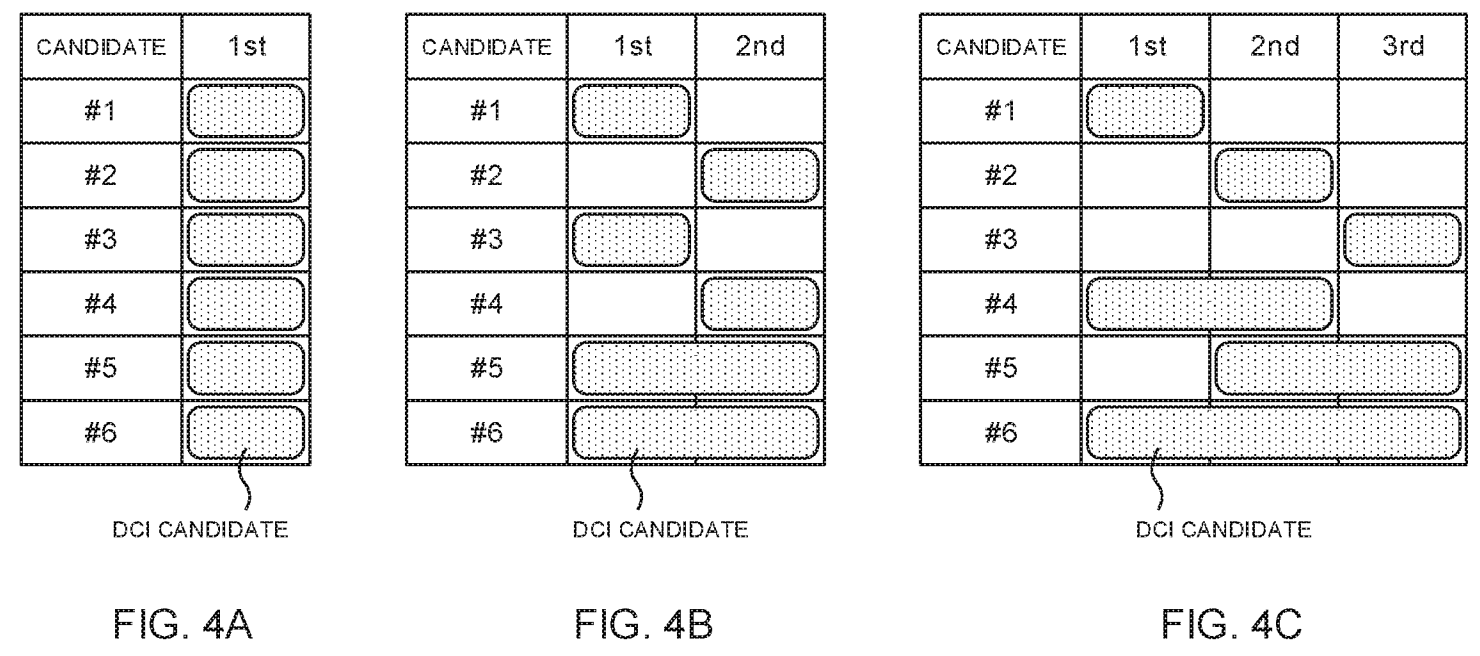

FIG. 4 illustrate examples of the method for mapping DCI candidates in the time domain. FIG. 4A illustrates a case in which the field to configure a downlink control channel is configured (for example, a control resource set) consists of one symbol (1st). In addition, FIGS. 4B and 4C illustrate cases in which the control resource sets consist of two symbols (1st and 2nd) and three symbols (1st to 3rd), respectively. That is, the second column, the second and third columns and the second to fourth columns in each table represent symbols of the field in which a downlink control channel is provided. The number of symbols to constitute a control resource set is not limited to three, and it is also possible to construct a control resource set using four or more symbols.

As illustrated in FIG. 4, DCI candidates can be mapped (allocated) at least on a symbol-by-symbol basis. In FIG. 4A, where the control resource set is comprised of one symbol, a plurality of DCI candidates that are mapped in one-symbol units (DCI candidates #1 to #6 here) can be provided.

In FIG. 4B, where the control resource set is comprised of two symbols, DCI candidates that are mapped in one-symbol units (DCI candidates #1 to #4 here) and DCI candidates that are mapped over two symbols (DCI candidates #5 to #6 here) can be configured. In FIG. 4C, where the control resource set is comprised of three symbols, DCI candidates that are mapped in one-symbol units (DCI candidates #1 to #3 here), DCI candidates that are mapped over two symbols (DCI candidates #4 to #5 here), and DCI candidates that are mapped over three symbols (here, DCI candidate #6) can be configured.

In this way, when a downlink control channel is provided in a plurality of symbols, blind decoding candidates that are mapped at least in one-symbol units are provided, so that it is possible to shorten the processing time by suitably applying pipeline processing.

Also, a radio base station can assign downlink control channels (downlink control information) to DCI candidates that are placed in the first half of the control resource set, thereby shortening the receiving operation of the user terminal. For example, as illustrated in FIG. 5A, when the control resource set is comprised of one symbol, DCI can be allocated to the DCI candidates that are formed in the first symbol (here, DCI candidates #1 to #6). Also, as illustrated in FIG. 5B, when the control resource set is comprised of two symbols, it is only necessary to selectively assign DCI to DCI candidates that are formed in the first symbol (here, DCI candidates #1 and #3). Also, as illustrated in FIG. 5C, when the control resource set is comprised of three symbols, DCI may be assigned to DCI candidates formed in the first symbol and/or the second symbol (DCI candidates #1, #2, and #4, here).

When the user terminal detects DCI in one of the DCI candidates constituted by the first-half symbols of the control resource set, it is possible to proceed with the DL data receiving processes without waiting for the second-half DCI candidates to be decoded. By this means, even when the control resource set is constituted by a plurality of symbols, the delay of receiving processes in the user terminal can be reduced.

Figures 6A, 6B, 6C:
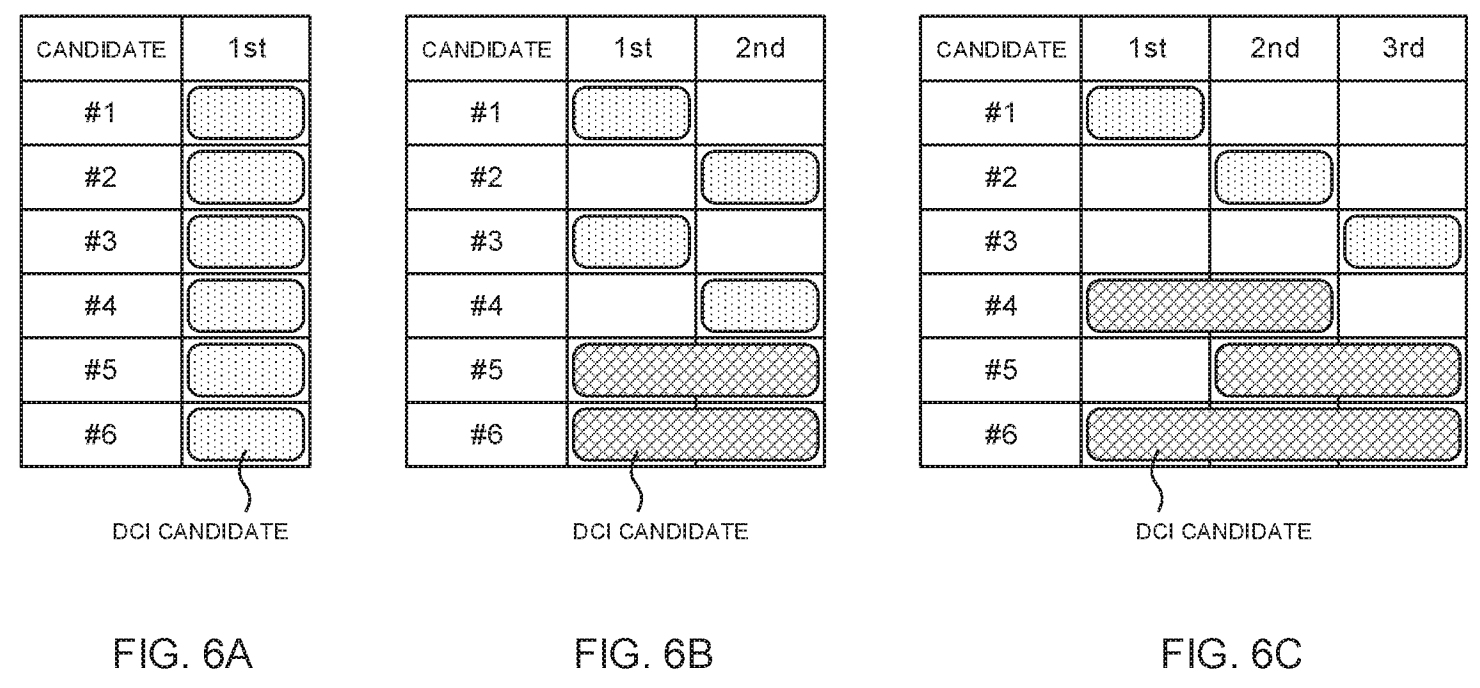

In addition, when the radio base station transmits DCI using DCI candidates that are mapped over a plurality of symbols (FIGS. 6B and 6C), the received signal energy when the transmission power is constant can be increased as compared with the case where the DCI candidates are each mapped in one symbol (DCI candidates #1 to #6 in FIG. 6A, DCI candidates #1 to #4 in FIG. 6B and DCI candidates #1 to #3 in FIG. 6C).

Alternatively, assuming that given DCI is to be transmitted using a certain amount of radio resources, transmitting this DCI using a plurality of symbols makes it possible to reduce the amount of transmission radio resources per symbol, compared to the case of transmitting this DCI using one symbol. As a result of this, the transmission power to assign to the radio resources that are transmitted per symbol of that DCI can be configured higher (power-boosting). Therefore, the radio base station can appropriately transmit the DCI (that is, the radio base station provides a better link budget or lowers the SINR required to achieve a predetermined error rate) by applying DCI candidates mapped over multiple symbols, to user terminals indicating high propagation loss such as cell-edge user terminals.

In addition, when mapping a DCI candidate over a plurality of symbols, the radio base station can assign DCI of different content to each symbol constituting that DCI candidate. For example, the radio base station can appropriately combine pieces of information representing a reference signal (RS), a resource allocation (RA), a modulation and coding scheme (MCS), a PUCCH resource, a TPC command, a HARQ timing command, a DAI, an SRS trigger, a CSI trigger and so on, and assign combinations of these to different symbols.

Figures 7A, 7B:
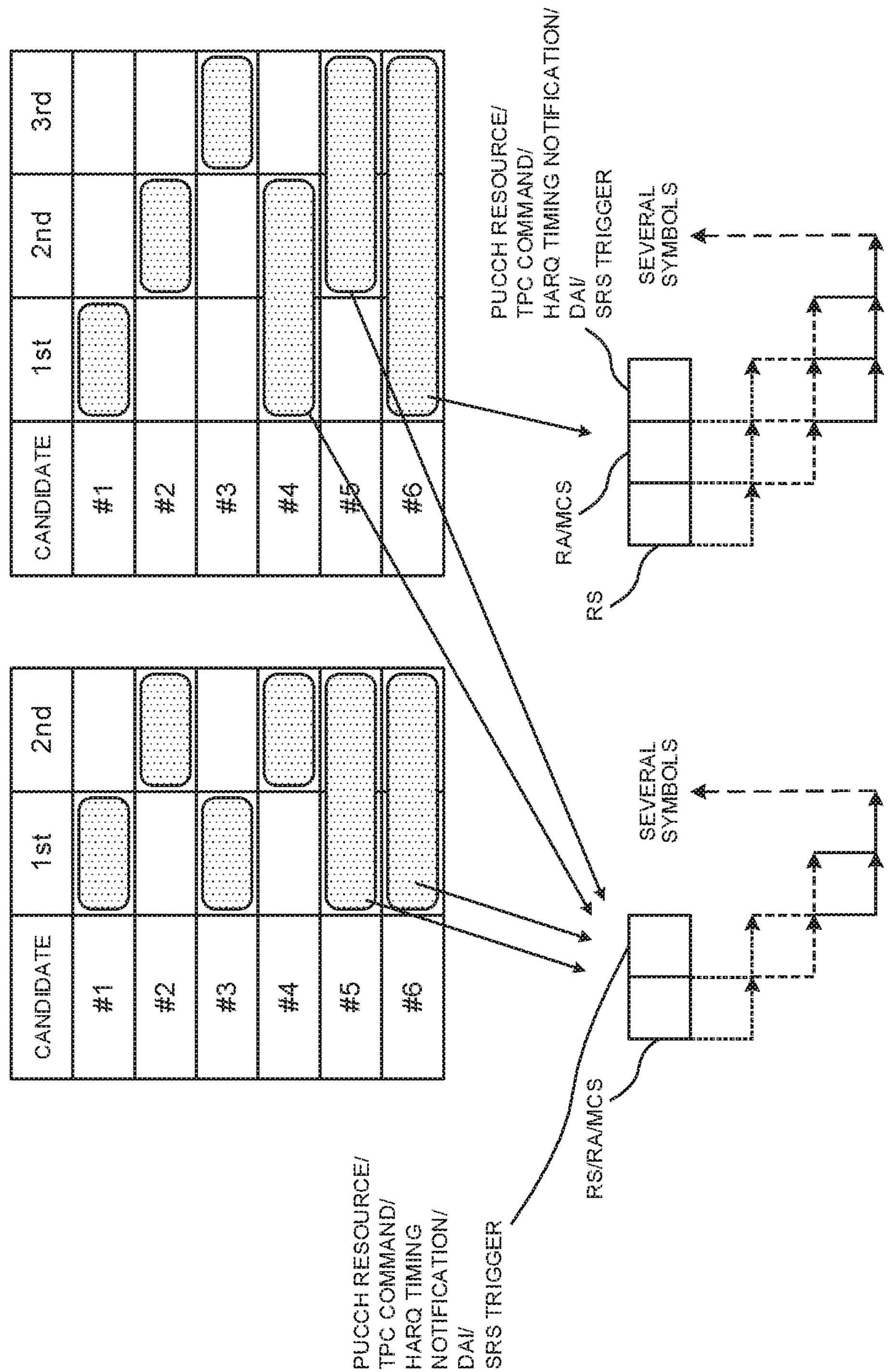
FIGS. 7A and 7B are diagrams to illustrate other examples of mapping of DCI candidates according to the first aspect.

In FIG. 7, where DCI candidates are mapped over two symbols (here, DCI candidates #5 and #6 in FIG. 7A and DCI candidates #4 and #5 in FIG. 7B), one or a combination of an RS, an RA and an MCS is allocated to the first symbol in the time direction. Also, a case is illustrated here where one or a combination of a PUCCH resource, a TPC command, an HARQ timing command, a DAI, an SRS trigger and a CSI trigger is allocated to the second symbol.

Also, where DCI candidates are mapped over three symbols (here, DCI candidate #6 in FIG. 7B), an RS is allocated to the first symbol in the time direction. Also, an RA and/or an MCS are assigned to the second symbol. Furthermore, a case is illustrated here where one or a combination of a PUCCH resource, a TPC command, an HARQ timing command, a DAI, an SRS trigger and a CSI trigger is allocated to the third symbol.

In this way, an RS, an RA, an MCS and so on, which are important and which are time-consuming in terms of receiving processes, are assigned to the first-half symbols among a plurality of symbols constituting DCI candidates, so that the user terminal can receive the RS, the RA, the MCS and so on earlier. This makes it possible to reserve time for receiving processes on the user terminal side.

<Assignment of DCI Candidates to Frequency Regions>

Multiple DCI candidates can be configured in different frequency regions and/or in partially-overlapping frequency regions (see FIG. 8 and FIG. 9). FIGS. 8A to 8D illustrate examples of methods of arranging a plurality of DCI candidates, which are mapped in one-symbol units (here, DCI candidates #1 to #6), in frequency fields, where the control resource set is constituted by one symbol.

For example, DCI candidates #1 to #6 can be arranged in different frequency fields (for example, in consecutive frequency fields) (see FIG. 8B). Alternatively, at least two of DCI candidates #1 to #6 can be arranged to overlap in a part of frequency fields (see FIGS. 8C and 8D). In the case illustrated in FIG. 8C, DCI candidate #1 is placed in a part of the frequency field of DCI candidate #2, DCI candidate #3 is placed in a part of the frequency field of DCI candidate #4, and DCI candidate #5 is placed in a part of the frequency field of DCI candidate #6. In the case illustrated in FIG. 8D, DCI candidate #1 is placed in a part of the frequency fields of DCI candidates #2 and #3, DCI candidate #2 is placed in a part of the frequency field of DCI candidate #3, DCI candidate #4 is placed in a part of the frequency fields of DCI candidates #5 and #6, and DCI candidate #5 is placed in a part of the frequency field of DCI candidate #6.

In this way, by providing a plurality of DCI candidates in different frequency fields and/or partially overlapping frequency fields, even when multiple users' DCIs are multiplexed and transmitted, it is easy to schedule the DCIs not to overlap among the users. Furthermore, it is possible to flexibly control the arrangement of DCI candidates. In addition, by providing frequency fields so as to overlap between DCI candidates, channel estimation and the like can be suitably performed even when a common demodulation reference signal is configured.

FIGS. 9A to 9C illustrate examples of methods of arranging DCI candidates that are mapped in one-symbol units (here, DCI candidates #1 to #4) and DCI candidates that are mapped over two symbols (here, DCI candidates #5 and #6) in the frequency field when the control resource set is constituted by two symbols.

For example, DCI candidates that are mapped in one-symbol units are placed in different frequency fields (for example, in consecutive frequency fields). Then, a DCI candidate to be mapped over two symbols can be provided so as to overlap the frequency field of one of the DCI candidates mapped in one-symbol units (see FIG. 9B). FIG. 9B illustrates a case where DCI candidates #1 and #5 are configured in the same frequency field and DCI candidates #3 and #6 are configured in the same frequency field. Thus, channel estimation and the like can be suitably performed even when a common demodulation reference signal is configured. In particular, the reference signal for performing channel estimation for a DCI candidate that is mapped over two symbols is included in the first symbol, so that it is possible to use a common reference signal among DCI candidates provided in the same frequency field, and, in this case, the channel estimation process can be simplified with ease.

Alternatively, DCI candidates to be configured over two symbols may be provided in different frequency fields on a per symbol basis. For example, FIG. 9C illustrate a case where the first symbol constituting DCI candidate #5 is provided in the same frequency field as DCI candidate #2, and where the second symbol constituting DCI candidate #5 is provided in the same frequency field as DCI candidate #1. Similarly a case is illustrated here where the first symbol constituting DCI candidate #6 is provided in the same frequency field as DCI candidate #4, and where the second symbol to constitute DCI candidate #6 is provided in the same frequency field as DCI candidate #4. By this means, DCI candidates mapped over two symbols can provide a frequency diversity effect.

<Configuration of Processing Time>

The processing time in a user terminal can be configured depending on which DCI candidate the user terminal detects. For example, if the last symbol where scheduling DCI (DL assignment) is arranged is the n-th symbol (where, for example, the control resource set is constituted by n symbols), the user terminal starts the receiving processes of the DL data from the (n+k)-th symbol, k can be, for example, 0, 1 or a value that can be configured as appropriate. When k is a configurable value, information about k may be reported to the user terminal via downlink control information and/or higher layer signaling.

Also, when the last symbol where scheduling DCI (UL grant) is allocated is the n-th symbol (where, for example, the control resource set is constituted by n symbols), the user terminal starts transmission processing of UL data from the (n+m)-th symbol, m can be, for example, 2 or 14 p (the number of symbols×the number of slots). Note that 14 is the number of symbols in a predetermined time interval (for example, slot), and p is the number of slots. Alternatively, m may be a value that can be configured as appropriate, and information about m may be reported to the user terminal via downlink control information and/or higher layer signaling and so on.

In this way, by controlling the processing time based on the number of symbols DCI candidates detected by the user terminal, it is possible to configure the processing time in the user terminal flexibly.

(Second Aspect)

In accordance with a second aspect of the present invention, a method of mapping reference signals for use in the receiving processes of DCI candidates will be described (for example, the demodulation process and/or the decoding process).

<Reference Signal Mapping Configuration 1>

Reference signals (for example, the DM-RS) which the user terminal uses in the receiving processes of each DCI candidate can be mapped to the first-half symbols (for example, the first symbol) in the time direction, among the symbols that constitute each DCI candidate. FIG. 10 illustrate examples of the mapping method of DCI candidates and reference signals in the time domain.

Figures 10A, 10B, 10C:
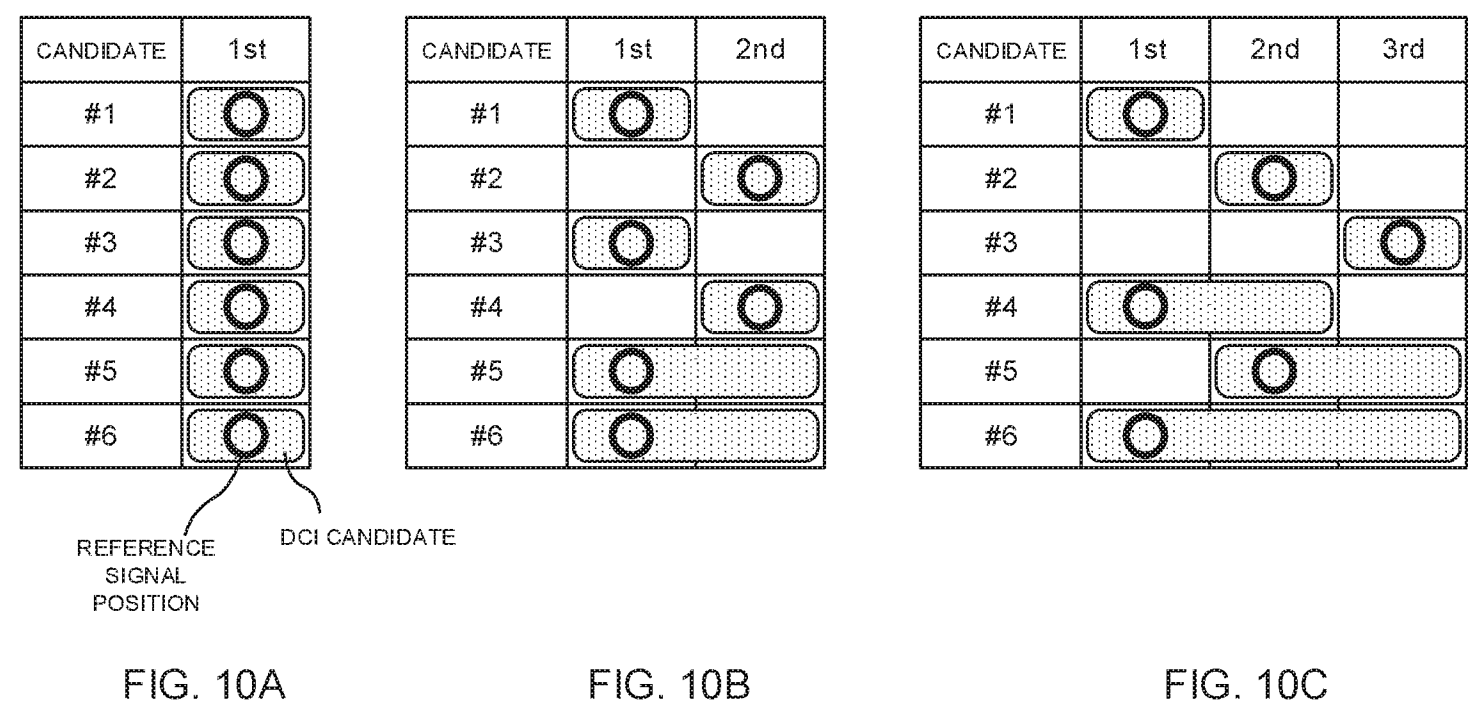

FIG. 10A illustrates a case where the field in which a downlink control channel is provided (for example, a control resource set) is comprised of one symbol. In addition, FIGS. 10B and 10C illustrate cases where the control resource set is comprised of two symbols and of three symbols, respectively. Note that the number of symbols to constitute a control resource set is not limited to three, and a control resource set may be comprised of four or more symbols.

If a control resource set is comprised of one symbol, multiple DCI candidates that are mapped in one-symbol units (here, DCI candidates #1 to #6) can be placed in the first symbol. In this case, the reference signals to use in the receiving processes of each DCI candidate are also placed in the first symbol (see FIG. 10A).

When a control resource set is comprised of two symbols, DCI candidates that are mapped in one-symbol units (here, DCI candidates #1 to #4) and DCI candidates that are mapped over two symbols (here, DCI candidates #5 to #6) can be provided. In this case, the reference signals to use in the receiving processes of each DCI candidate are also placed in the first symbol constituting each DCI candidate (see FIG. 10B). In FIG. 10B, the user terminal performs the demodulation process and/or other processes on DCI candidates #1, #3, #5, and #6 by using the reference signals mapped to the first symbol of the control resource set. In addition, the user terminal performs the demodulation process and/or other processes on DCI candidates #2 and #4 using the reference signals mapped to the second symbol of the control resource set.

When a control resource set is constituted by three symbols, DCI candidates that are mapped in one-symbol units (here, DCI candidates #1 to #3), DCI candidates that are mapped over two symbols (here, DCI candidates #4 to #5), and DCI candidates that are mapped over three symbols (here, DCI candidate #6) can be provided. In this case, the reference signals to use in the receiving processes of each DCI candidate are also placed in the first symbol constituting each DCI candidate (see FIG. 10C). In FIG. 10C, the user terminal performs the demodulation process and/or other processes on DCI candidates #1, #4, and #6 using the reference signals mapped to the first symbol of the control resource set. In addition, the user terminal performs the demodulation process and/or other processes on DCI candidates #2 and #5 using the reference signals mapped to the second symbol of the control resource set. In addition, the user terminal performs the demodulation process and/or other processes on DCI candidate #3 using the reference signal mapped to the third symbol of the control resource set.

In this manner, the receiving processes for DCI candidates are performed using reference signals that are mapped to the first half of the symbols constituting the DCI candidates, so that the channel estimation operation can be executed at an early timing. As a result, the processing time of the receiving processes can be shortened.

Furthermore, the reference signals may be provided per DCI candidate, or common reference signals may be used between different DCI candidates (see FIG. 11). FIGS. 11A to 11D illustrate examples of methods of arranging a plurality of DCI candidates that are mapped in one-symbol units (here, DCI candidates #1 to #6) and reference signals, where the control resource set is constituted by one symbol.

For example, when arranging DCI candidates #1 to #6 in different frequency fields, reference signals are provided on a per DCI candidate basis (see FIG. 11B). In this case, the user terminal performs the demodulation process using the reference signal provided for each DCI candidate, so that the user terminal can properly receive each DCI candidate.

In the case where DCI candidates #1 to #6 are arranged so as to overlap in some frequency fields, the same reference signals may be used in common among different DCI candidates. In the case illustrated in FIG. 11C, DCI candidate #1 is placed in a part of the frequency field of DCI candidate #2, DCI candidate #3 is placed in a part of the frequency field of DCI candidate #4, and DCI candidate #5 is placed in a part of the frequency field of DCI candidate #6. In this case, the reference signals for use for the receiving processes of DCI candidate #1 can be used in the receiving processes of DCI candidate #2. Similarly, the reference signals for use for the receiving processes of DCI candidate #3 can be used in the receiving processes of DCI candidate #4, and the reference signals for use for the receiving processes of DCI candidate #5 can be used in the receiving processes of DCI candidate #6.

In the case illustrated in FIG. 11D, DCI candidate #1 is placed in a part of the frequency regions of DCI candidates #2 and #3, DCI candidate #2 is placed in a part of the frequency region of DCI candidate #3, DCI candidate #4 is allocated in a part of the frequency regions of DCI candidates #5 and #6, and DCI candidate #5 is placed in a part of the frequency region of DCI candidate #6. In this case, the reference signals for use for the receiving processes of DCI candidate #1 can be used in the receiving processes of DCI candidates #2 and #3, and the reference signals for use for the receiving processes of DCI candidate #2 can be used in the receiving processes of DCI candidate #3. Similarly, the reference signals for use for the receiving processes of DCI candidate #4 can be used in the receiving processes of DCI candidates #5 and #6, and the reference signals for use for the receiving processes of DCI candidate #5 can be used in the receiving processes of DCI candidate #6.

In this way, by configuring common reference signals among different DCI candidates, it is possible to prevent the resources to allocate to reference signals from increasing, and, furthermore, carry out receiving processes for each DCI candidate appropriately.

Figures 12A, 12B:
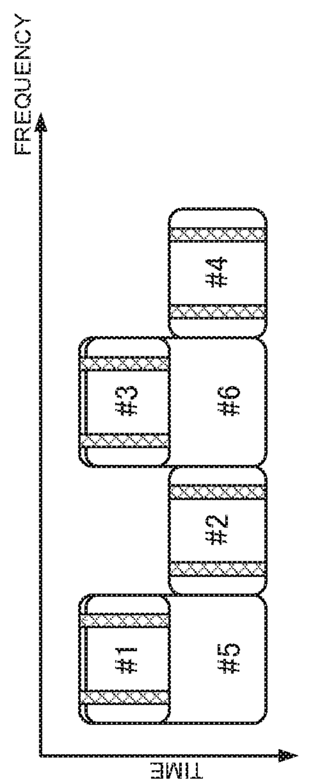
FIGS. 12A and 12B are diagrams to illustrate other examples of mapping of DCI candidates and reference signals according to the second aspect.

FIGS. 12A and 12B illustrate examples of methods of arranging DCI candidates that are mapped in one-symbol units (here, DCI candidates #1 to #4), DCI candidates that are mapped over two symbols (here, DCI candidates #5 and #6) and reference signals that are used to receive each DCI candidate, where the control resource set is comprised of two symbols.

For example, assume the case where DCI candidates that are mapped in one-symbol units are arranged in different frequency fields, and DCI candidates that are mapped over two symbols are each provided in the frequency field of one of the DCI candidates that are mapped in one-symbol units (see FIG. 12B). FIG. 12B illustrates the case where DCI candidates #1 and #5 are configured in the same frequency field, and DCI candidates #3 and #6 are configured in the same frequency field. In this case, the reference signals for use for the receiving processes of DCI candidate #1 can be used in the receiving processes of DCI candidate #5, and the reference signals for use for the receiving processes of DCI candidate #3 can be used in the receiving processes of DCI candidate #6.

<Reference Signal Mapping Configuration 2>

Alternatively, a structure may be adopted here in which the reference signal for demodulating each DCI candidate is mapped to the first-half symbols in the control resource set (for example, the first symbol in the control resource set).

FIG. 13A illustrates a case where the control resource set is constituted by one symbol. In addition, FIGS. 13B and 13C illustrate cases where a control resource set is comprised of two symbols and of three symbols, respectively. The number of symbols to constitute a control resource set is not limited to three, and a control resource set may be comprised of four or more symbols.

If a control resource set is comprised of one symbol, multiple DCI candidates that mapped in one-symbol units (here, DCI candidates #1 to #6) can be placed in the first symbol. In this case, the reference signals to use in the receiving processes of each DCI candidate are also placed in the first symbol (see FIG. 13A).

When a control resource set is comprised of two symbols, DCI candidates that are mapped in one-symbol units (here, DCI candidates #1 to #4), and DCI candidates that are mapped over two symbols (here, DCI candidates #5 to #6) can be provided. In this case, the reference signals to use in the receiving processes of each DCI candidate are placed in the first symbol constituting the control resource set, regardless of the position of the symbol where each DCI candidate is located (see FIG. 13B). In FIG. 13B, the user terminal performs the demodulation process at least for DCI candidates #1 and #3, #5 and #6 arranged in the first symbol, and also for DCI candidates #2 and #4, which are not placed in the first symbol, using the reference signals mapped to the first symbol in the control resource set.

Figures 14A, 14B:
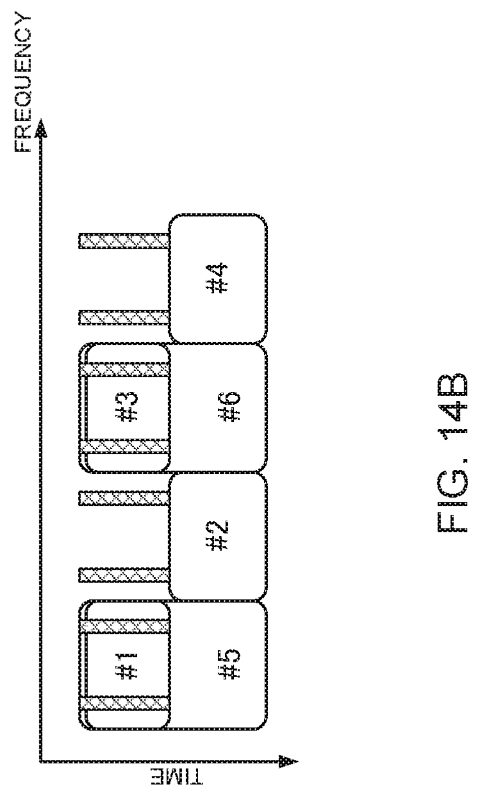
FIGS. 14A and 14B are diagrams to illustrate other examples of mapping of DCI candidates and reference signals according to the second aspect.

Note that, when different DCI candidates (for example, DCI candidates #1 and #5, DCI candidates #3 and #6, etc.) are configured in the same frequency region, common reference signals may be configured between different DCI candidates. In FIGS. 14A and 14B, the user terminal can use the reference signals used for the receiving processes of DCI candidate #1 in the receiving processes of DCI candidate #5, and use the reference signals for the receiving processes of DCI candidate #3 in the receiving processes of DCI candidate #6. In addition, the user terminal performs the receiving processes for DCI candidates #2 and #4 arranged in the second symbol, by using the reference signals placed in the first symbol.

When a control resource set is constituted by three symbols, DCI candidates that are mapped in one-symbol units (here, DCI candidates #1 to #3), DCI candidates that are mapped over two symbols (here, DCI candidates #4 to #5), and DCI candidates that are mapped over three symbols (here, DCI candidate #6) can be provided. In this case, the reference signals to use for the receiving processes of each DCI candidate are placed in the first symbol constituting the control resource set, regardless of the symbol position where each DCI candidate is placed (see FIG. 13C). In FIG. 13C, the user terminal performs the demodulation process at least for DCI candidates #1, #4 and #6 that are arranged in the first symbol, and also for DCI candidates #2, #3 and #5 that are not placed in the first symbol, by using the reference signals mapped to the first symbol in the control resource set.

As described above, by performing the receiving processes of DCI candidates by using reference signals that are mapped to the first-half symbols constituting the control resource set, the channel estimation operation can be performed at an early timing, regardless of the arrangement position of the DCI candidate. In this way, it is possible to suppress the latency of the processing time of the receiving process, <Reference Signal Mapping Configuration 3>

Also, the reference signals that are used to receive each DCI candidate may be configured so that the same reference signal can be used in common by as many DCI candidates as possible (see FIG. 15).

When a control resource set is comprised of one symbol, a plurality of DCI candidates that are mapped in one-symbol units (here, DCI candidates #1 to #6) and a reference signal are arranged in the first symbol (see FIG. 15A). In this case, the user terminal performs the receiving processes using the same reference signal among the varying DCI candidates (for example, between DCI candidates where the frequency fields partially overlap or DCI candidates where adjacent frequency fields are allocated). In this way, it is possible to reduce the resources to allocate to reference signals.

When a control resource set is comprised of two symbols, DCI candidates that are mapped in one-symbol units (here, DCI candidates #1 to #4), and DCI candidates that are mapped over two symbols (here, DCI candidates #5 and #6) can be provided. In this case, the receiving processes can be performed using a common reference signal for one, or a combination of all, of DCI candidates #1, #3, #5, and #6 (for example, a combination of DCI candidates with overlapping frequencies) (see FIG. 15B). Furthermore, the receiving processes can be performed using a common reference signal for the combination of DCI candidates #2 and #4 (and/or #5 and #6).

When a control resource set is constituted by three symbols, DCI candidates that are mapped in one-symbol units (here, DCI candidates #1 to #3), DCI candidates that are mapped over two symbols (here, DCI candidates #4 to #5), and DCI candidates that are mapped over three symbols (here, DCI candidate #6) can be provided. In this case, the receiving processes can be performed using a common reference signal for one, or a combination of all, of DCI candidates #2, #4, #5, and #6 (for example, a combination of DCI candidates with overlapping frequencies) (see FIG. 15C).

In this way, by configuring the same reference signal among as many DCI candidates as possible in common, it is possible to reduce the resources to allocate to reference signals, and improve the efficiency of the use of resources.

<Reference Signal Mapping Configuration 4>

Furthermore, the reference signals to use to receive each DCI candidate may be configured for all the symbols constituting each DCI candidate (see FIG. 16). By this means, analog beamforming (analog BF) can be suitably applied to each DCI candidate configured over a plurality of symbols.

Analog BF refers to a method of using phase shifting devices on RF. In this case, since it is only necessary to rotate the phase of RF signals, analog BF can be realized with simple and inexpensive configurations, but it is nevertheless not possible to form a plurality of beams at the same time. To be more specific, when analog BF is used, each phase shifting device can only form one beam at a time. Therefore, if a base station (referred to as “evolved Node B (eNB),” “BS (Base Station),” “gNB,” etc.) has only one phase shifting device, only one beam can be formed at a given time. Therefore, when multiple beams are transmitted using analog BF alone, it is not possible to simultaneously transmit these beams using the same time resources, and therefore the beams need to be switched in time, be rotated, and so on.

Figures 16A, 16B, 16C:
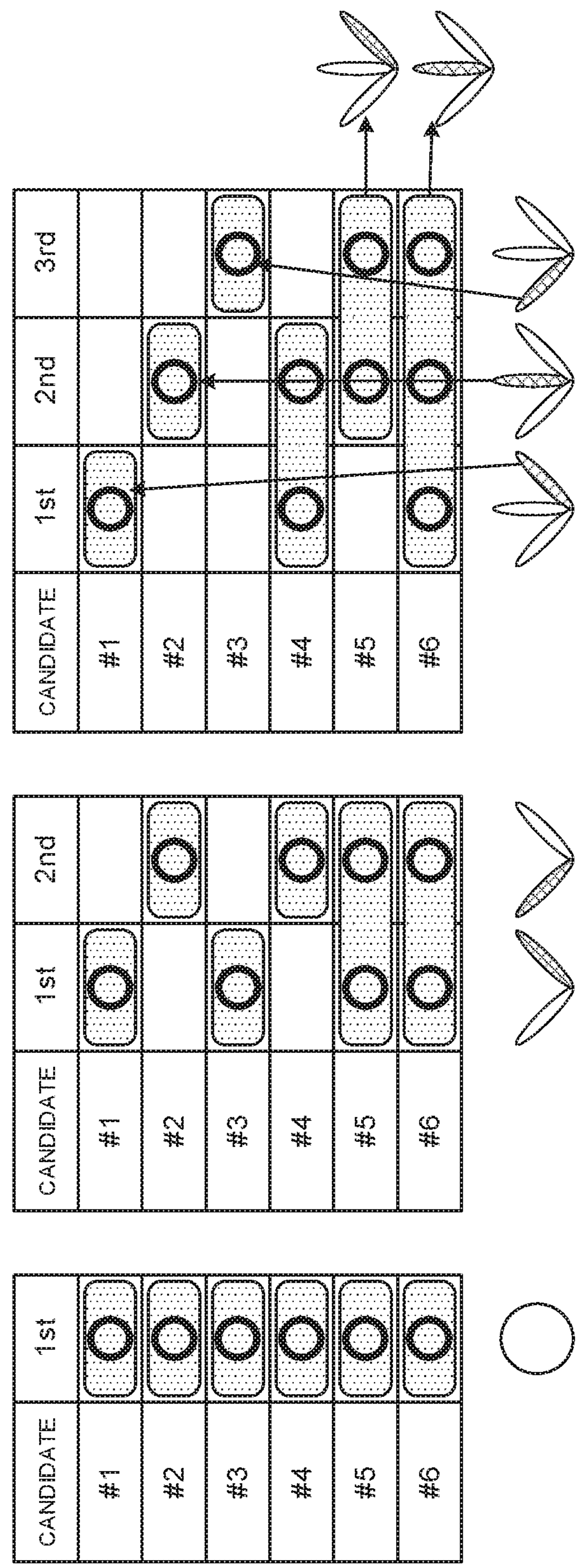
FIGS. 16A to 16C are diagrams to illustrate other examples of mapping of DCI candidates and reference signals according to the second aspect.

When a control resource set is comprised of one symbol, a plurality of DCI candidates that are mapped in one-symbol units (here, DCI candidates #1 to #6) and a reference signal are arranged in the first symbol (see FIG. 16A). In this case, a predetermined beam (for example, a single beam) is applied to the downlink control information that is assigned to each DCI candidate and/or the reference signal that is used to receive this downlink control information.

When a control resource set is comprised of two symbols, DCI candidates that are mapped in one-symbol units (here, DCI candidates #1 to #4), and DCI candidates that are mapped over two symbols (here, DCI candidates #5 to #6) can be provided (see FIG. 16B). In this case, the first beam can be applied to the reference signal corresponding to DCI candidates #1 and #3, the second beam can be applied to the reference signal corresponding to DCI candidates #2 and #4. Also, for the reference signal corresponding to DCI candidates #5 and #6, the first beam is applied to the first symbol, and the second beam is applied to the second symbol. Alternately, for the reference signal corresponding to DCI candidates #5 and #6, the same beam may be applied to consecutive symbols.

When a control resource set is comprised of three symbols, it is possible to configure DCI candidates that are mapped in one-symbol units (here, DCI candidates #1 to #3), DCI candidates that are mapped over two symbols (here, DCI candidates #4 to #5) and DCI candidates that are mapped over three symbols (here, DCI candidate #6) (see FIG. 16C). In this case, the first beam can be applied to the reference signal corresponding to DCI candidate #1, the second beam can be applied to the reference signal corresponding to DCI candidate #2, and the third beam can be applied to the reference signal corresponding to DCI candidate #3.

Also, for the reference signal corresponding to DCI candidate #4, the first beam is applied to the first symbol, and the second beam is applied to the second symbol. Also, in the reference signal corresponding to DCI candidate #5, the second beam is applied to the first symbol, and the third beam is applied to the second symbol. Also, in the reference signal corresponding to DCI candidate #6, the first beam is applied to the first symbol, the second beam is applied to the second symbol, and the third beam is applied to the third symbol. Alternatively, for the reference signal corresponding to DCI candidates #4, #5 and #6, the same beam may be applied to each continuous symbol.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 17:
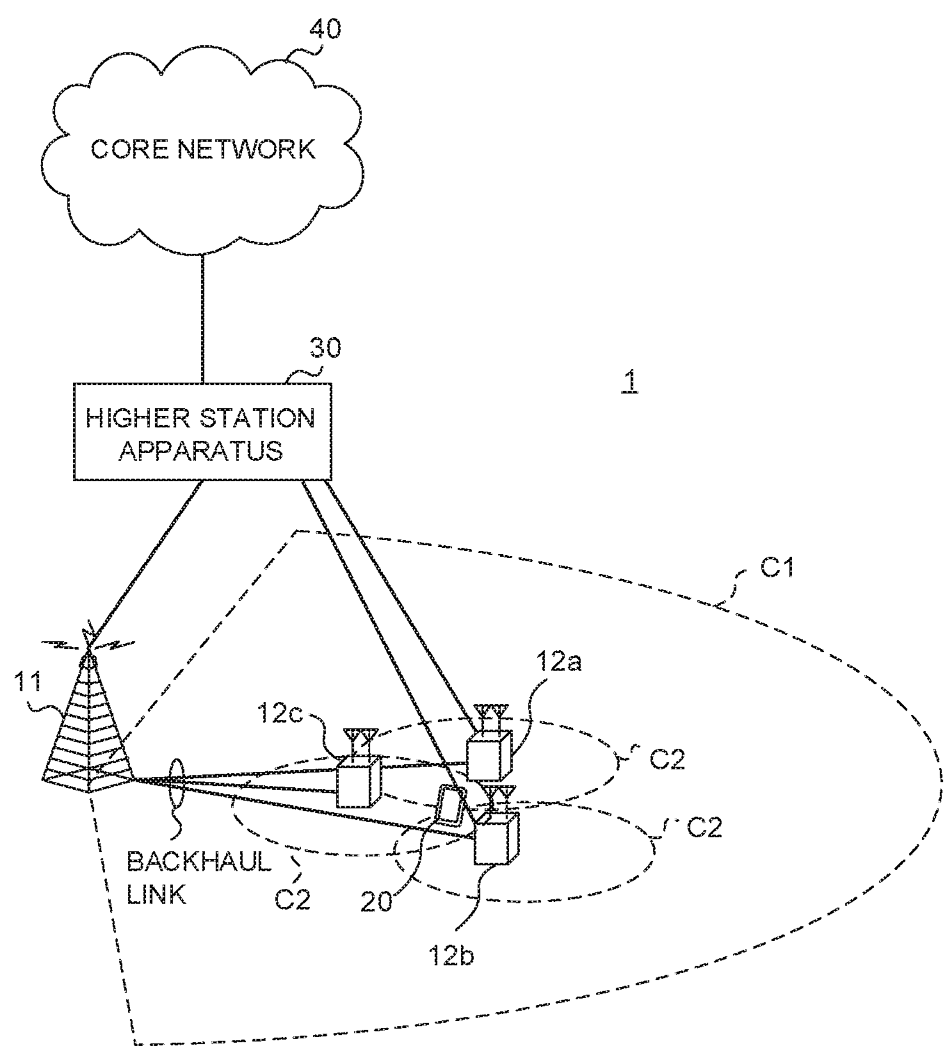
FIG. 17 is a diagram to illustrate an example of a schematic structure of a radio communication system according to one embodiment of the present invention.

FIG. 17 is a diagram to illustrate an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as “LTE (Long Term Evolution),” “LTE-A (LTE-Advanced),” “LTE-B (LTE-Beyond),” “SUPER 3G, “IMT-Advanced,” “4G (4th generation mobile communication system),” “5G (5th generation mobile communication system),” “FRA (Future Radio Access),” “New-RAT (Radio Access Technology),” “NR (New Radio)” and so on, or may be seen as a system to implement these.

The radio communication system 1 includes a radio base station 11 that forms a macro cell C1 having a relatively wide coverage, and radio base stations 12 (12*a* to 12*c*) that are placed within the macro cell C1 and that form small cells C2, which are narrower than the macro cell C1. Also, user terminals 20 are placed in the macro cell C1 and in each small cell C2. The arrangement of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an “existing carrier,” a “legacy carrier” and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "gNB," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

The radio communication system 1 may be configured so that different numerologies are used within cells and/or between cells. Note that a numerology refers to, for example, a set of communication parameters (for example, the subcarrier spacing, the bandwidth, etc.) that are used to transmit and receive a certain signal.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 18:
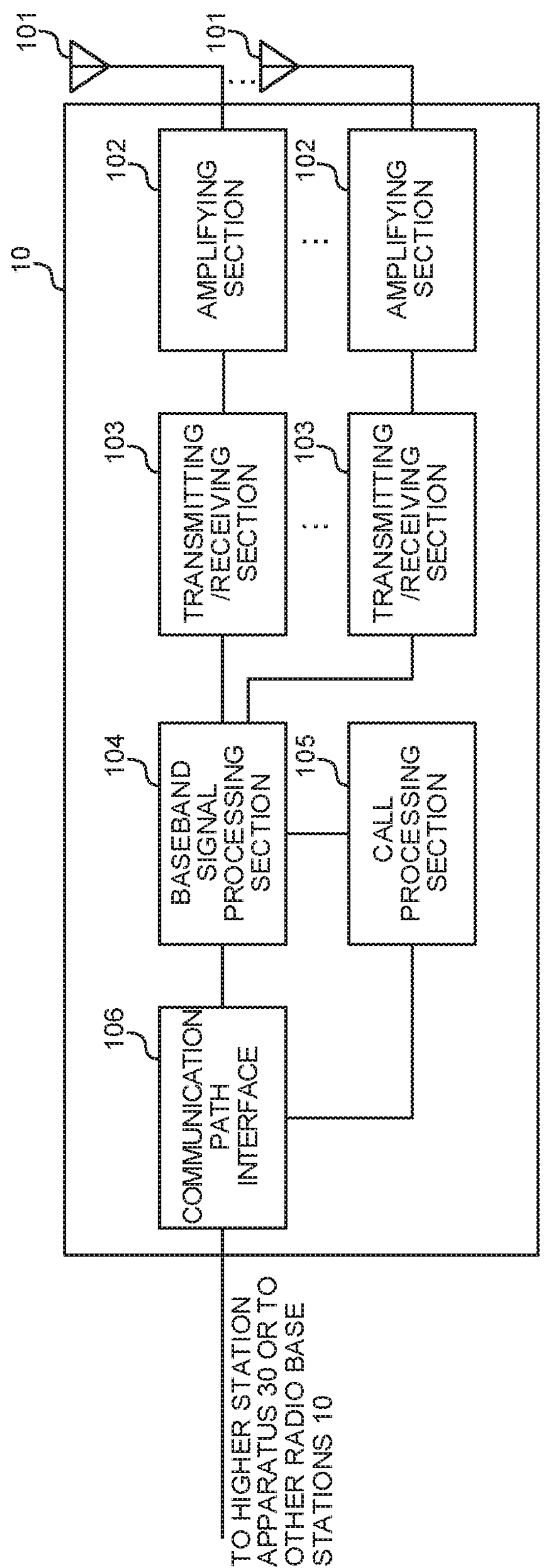
FIG. 18 is a diagram to illustrate an example of an overall structure of a radio base station according to one embodiment of the present invention.

FIG. 18 is a diagram to illustrate an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit a downlink control channel (for example, an NR-PDCCH) using a search space (C-SS and/or a UE-SS). Also, when the downlink control channel is configured in multiple symbols, the transmitting/receiving sections 103 transmit downlink control information using downlink control channel allocation candidates that are arranged in one-symbol units, and downlink control channel allocation candidates that are arranged over multiple symbols (see FIG. 4).

Figure 19:
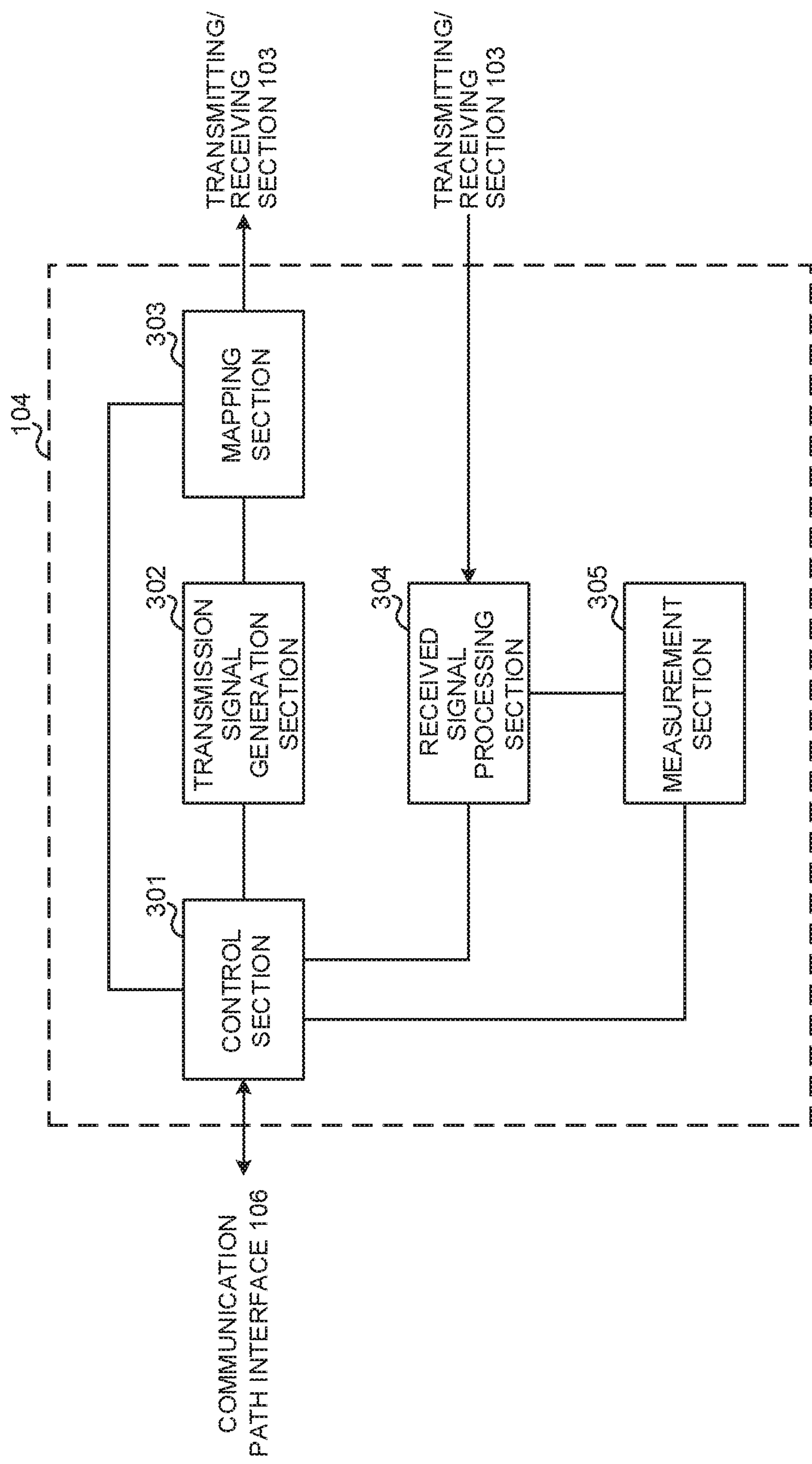
FIG. 19 is a diagram to illustrate an example of a functional structure of a radio base station according to one embodiment of the present invention.

FIG. 19 is a diagram to illustrate an example of a functional structure of a radio base station according to one embodiment of the present invention. Note that, although this example primarily illustrates functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 341, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PUSCH) and downlink control signals (for example, signals communicated in downlink control channels). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

The control section 301 controls the transmission of downlink control channels using the C-SS and/or the UE-SS. Also, when the downlink control channel is configured in multiple symbols, the control section 301 control the transmission of downlink control channel allocation candidates that are arranged in one-symbol units and downlink control channel allocation candidates that are arranged over multiple symbols (see FIG. 4 and others).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/ receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example CSI) and so on. The measurement results may be output to the control section 301.

(User Terminal)

Figure 20:
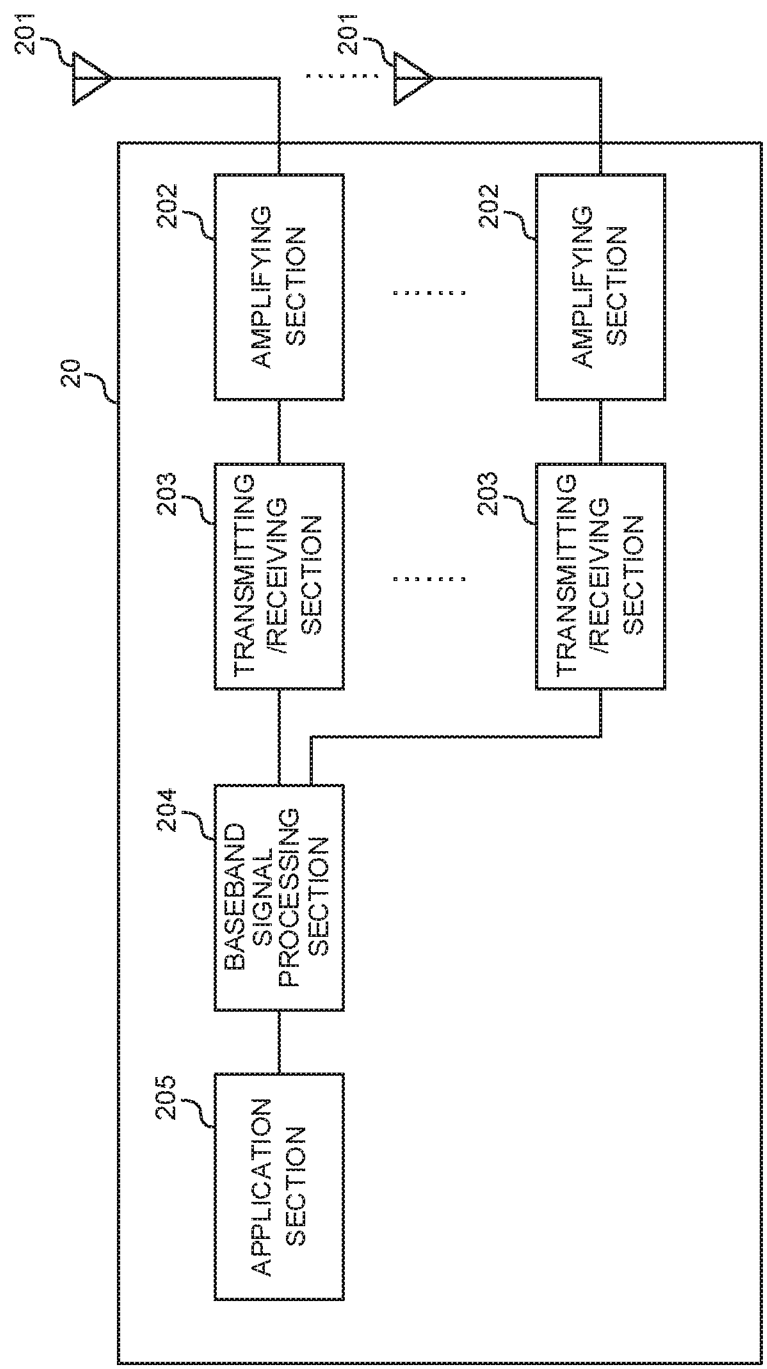
FIG. 20 is a diagram to illustrate an example of an overall structure of a user terminal according to one embodiment of the present invention.

FIG. 20 is a diagram to illustrate an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARM transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 receive a downlink control channel (for example, an NR-PDCCH) that is included in a C-SS and/or a UE-SS. Also, if the downlink control channel is configured in multiple symbols, the transmitting/receiving sections 203 receive downlink control channel allocation candidates that are arranged in one-symbol units and downlink control channel allocation candidates that are arranged over multiple symbols (see FIG. 4).

Also, for the downlink control channel allocation candidates that are arranged over multiple symbols, the transmitting/receiving sections 203 can perform the receiving processes by using at least the reference signal assigned to the first symbol in a plurality of symbols (see FIG. 10 and others). Also, the transmitting/receiving sections 203 can perform the receiving processes for different downlink control channel allocation candidates by using a common reference signal (see FIGS. 11, 12, and 14, etc.).

Figure 21:
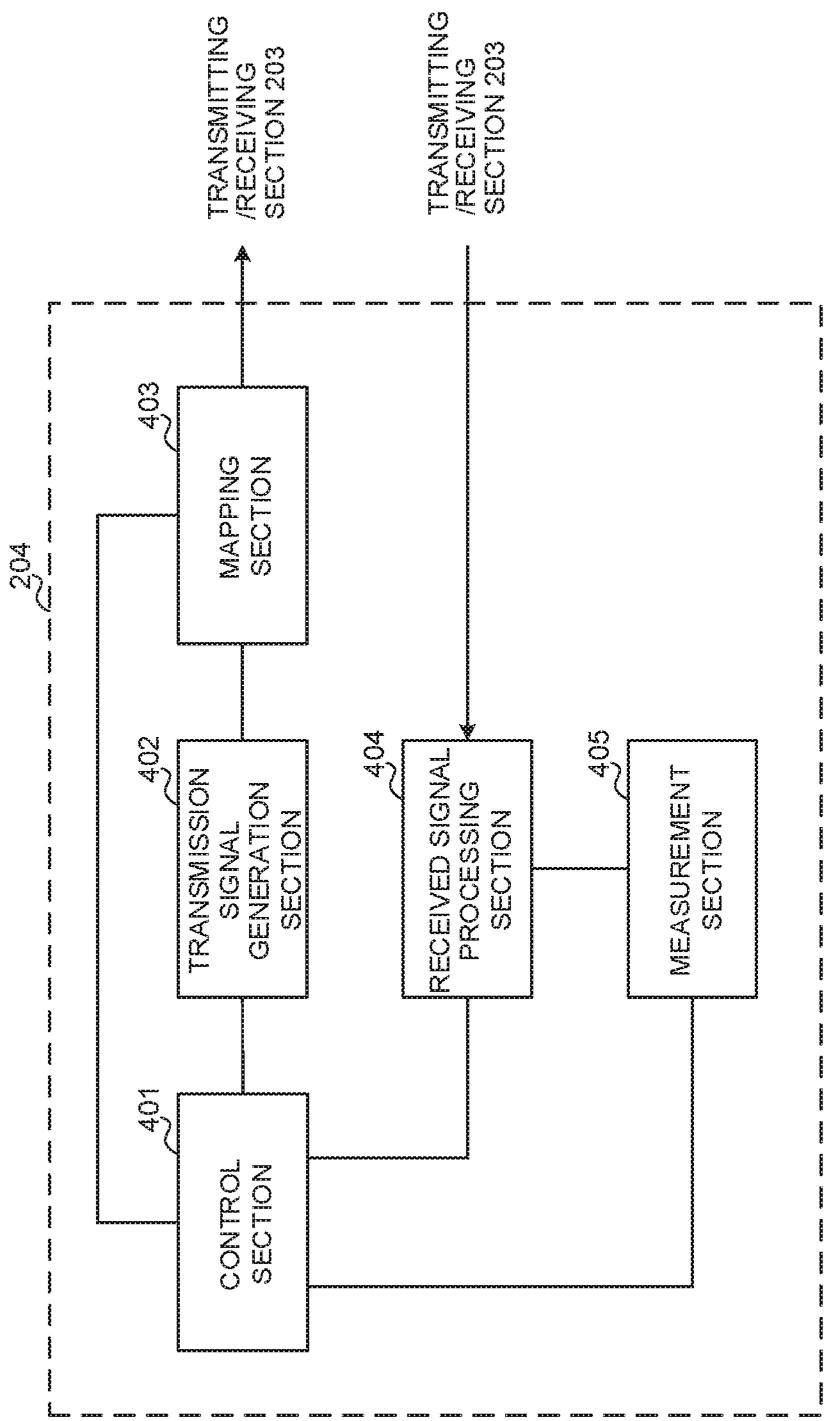
FIG. 21 is a diagram to illustrate an example of a functional structure of a user terminal according to one embodiment of the present invention.

FIG. 21 is a diagram to illustrate an example of a functional structure of a user terminal according to one embodiment of the present invention. Note that, although this example primarily illustrates functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals (for example, signals transmitted in downlink control channels) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 controls the detection of search spaces that serve as candidates for allocating downlink control channels. For example, if the downlink control channel is configured in multiple symbols, the control section 401 controls the detection of downlink control channel allocation candidates that are arranged in one-symbol units and/or downlink control channel allocation candidates that are arranged over multiple symbols (see FIG. 4 and others). In addition, the control section 401 can detect candidates for allocating the downlink control channel in order of symbols that are received (see FIG. 5 and others).

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example CSI) and so on of the received signals. The measurement results may be output to the control section 401.

(Hardware Structure)

Note that the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 22:
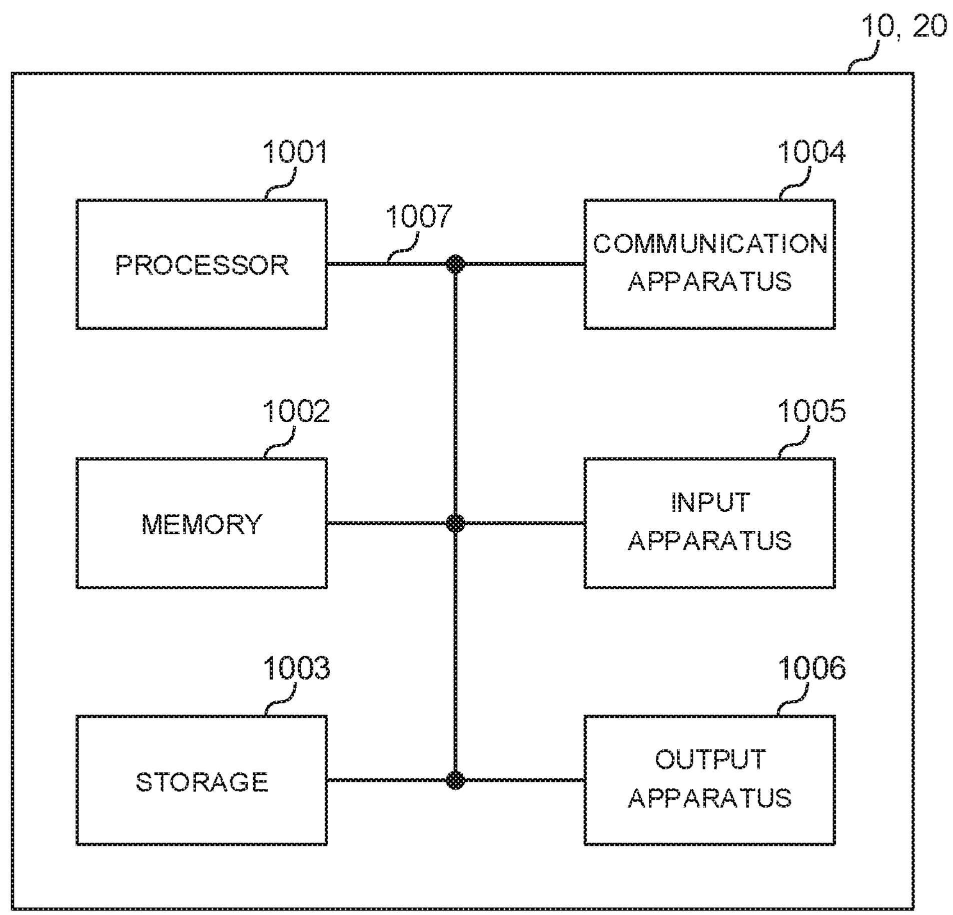
FIG. 22 is a diagram to illustrate an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 22 is a diagram to illustrate an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus illustrated in the drawings, or may be designed not to include part of the apparatus.

For example, although only one processor 1001 is illustrated, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG Sub-Carrier Group)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-001443, filed on Jan. 6, 2017, including the specification, drawings and abstract, is incorporated herein by reference in its entirety.

The invention claimed is:

1. A terminal comprising:

a receiver that receives downlink control information (DCI) for scheduling a Physical Uplink Shared Channel (PUSCH), on a Physical Downlink Control Channel (PDCCH); and a processor that controls to transmit the PUSCH after a given number of symbols from a last symbol of the PDCCH, wherein the given number of symbols is determined based on at least one of the DCI and higher layer signaling.

2. The terminal according to claim 1, wherein a number of symbols that constitute a control resource set including the PDCCH is 1, 2 or 3.

3. The terminal according to claim 1, wherein a number of symbols that constitute a control resource set including the PDCCH is 3.

4. A radio communication method for a terminal, comprising:

receiving downlink control information (DCI) for scheduling a Physical Uplink Shared Channel (PUSCH), on a Physical Downlink Control Channel (PDCCH); and controlling to transmit the PUSCH after a given number of symbols from a last symbol of the PDCCH, wherein the given number of symbols is determined based on at least one of the DCI and higher layer signaling.

5. A base station comprising:

a transmitter that transmits downlink control information (DCI) for scheduling a Physical Uplink Shared Channel (PUSCH), on a Physical Downlink Control Channel (PDCCH); and a receiver that receives the PUSCH that is transmitted, by a terminal, after a given number of symbols from a last symbol of the PDCCH, wherein the given number of symbols is determined based on at least one of the DCI and higher layer signaling.

6. A system comprising a terminal and a base station, wherein:

the terminal comprises:

a first receiver that receives downlink control information (DCI) for scheduling a Physical Uplink Shared Channel (PUSCH), on a Physical Downlink Control Channel (PDCCH); and a processor that controls to transmit the PUSCH after a given number of symbols from a last symbol of the PDCCH, and the base station comprises:

a transmitter that transmits the DCI on a Physical Downlink Control Channel (PDCCH); and a second receiver that receives the PUSCH, wherein the given number of symbols is determined based on at least one of the DCI and higher layer signaling.

* * * * *